United States Patent [19]

Stewart

[11] Patent Number: 5,086,521
[45] Date of Patent: Feb. 11, 1992

[54] PADDED TOILET SEAT LID

[75] Inventor: John M. Stewart, River Drive Park, Canada

[73] Assignee: Sanitation Equipment Limited, Concord, Canada

[21] Appl. No.: 651,071

[22] Filed: Feb. 6, 1991

Related U.S. Application Data

[62] Division of Ser. No. 476,233, Feb. 2, 1990, Pat. No. 5,022,946.

[30] Foreign Application Priority Data

Nov. 16, 1989 [CA] Canada ............................... 2003103

[51] Int. Cl.$^5$ ...................... A47K 13/00; A47K 13/14
[52] U.S. Cl. ........................................... 4/234; 4/242; 4/246; 4/244
[58] Field of Search ................... 4/234, 237, 242, 244, 4/246; 297/452, 219, 456, 455

[56] References Cited

U.S. PATENT DOCUMENTS

| 2,655,666 | 10/1953 | Schmidt | 4/242 |
| 2,771,612 | 11/1956 | Samuels | 4/237 |
| 5,000,513 | 3/1991 | Schmidt | 297/219 |

Primary Examiner—Henry J. Recla
Assistant Examiner—David J. Walczak
Attorney, Agent, or Firm—Rogers, Bereskin & Parr

[57] ABSTRACT

A padded toilet seat lid is made by magnetically induction welding to the upper surface of a plastic lid shell, a plastic frame which surrounds a cushion providing the padding. The frame traps a peripheral margin of the cushion against the upper surface of the lid. The cushion is also secured to the lid by a pressure-sensitive adhesive. Welding of the frame to the lid is accomplished in a special fixture that supports the lid and cushion upside down.

7 Claims, 2 Drawing Sheets

PADDED TOILET SEAT LID

This is a continuation of application Ser. No. 07/476,233 filed Feb. 2, 1990, now U.S. Pat. No. 5,022,946.

FIELD OF THE INVENTION

This invention relates generally to toilets and is concerned more particularly with a method of making a padded toilet seat lid, and a lid made by the method.

BACKGROUND OF THE INVENTION

Padded toilet seat lids have previously been proposed. However, there are practical difficulties in making a satisfactory padded lid at low cost. The lid itself must be aesthetically pleasing and functional. It must also be designed to avoid as far as possible crevices and other areas in which dirt may accumulate and must be capable of being cleaned easily. The method of making the lid must be reliably reproducible on a production basis and the per unit cost of the end product (the padded lid) should be as low as possible.

In one prior art method, a plastic lid shell or base is produced with a large rectangular indented centre portion to receive a pad or cushion. The pad includes an aluminum plate having a vinyl coating on its top surface. A vinyl cover is heat-sealed to the vinyl coating with a foam layer in between. The aluminum plate is riveted to the lid shell. A disadvantage of this method is relatively high cost. Also, the rivets are visible inside the lid when it is raised, which is somewhat unsightly.

SUMMARY OF THE INVENTION

An object of the present invention is to provide an improved method of making a padded toilet seat lid, and a lid made by the method.

In its method aspect, the invention involves the steps of providing a lid base or shell having an upper surface portion of a thermoplastic material and providing a cushion having a peripheral margin for securing the cushion to the lid surface portion. A thermoplastic frame is designed to extend around the margin of the cushion for securing the cushion to the lid portion. The frame has inner and outer parts for overlying respectively the peripheral margin of the cushion and a surrounding part of the lid surface portion. The outer part of the frame is adapted to be sealed to the lid surface portion and has a lower surface provided with a groove for receiving a sealing strip. The inner frame part is adapted to hold the cushion against the lid surface portion when the outer frame part is sealed to the lid. This is achieved by providing a sealing strip which is adapted to be received in the groove in the frame outer part. The strip is made of a thermoplastic material which is capable of fusing with the lid surface portion and the frame and has magnetically excitable particles dispersed therein. The lid, cushion, frame and sealing strip are assembled in their intended final relative positions and the sealing strip is subjected to the effect of a high-frequency magnetic field having characteristics selected to excite the particles in the sealing strip to an extent sufficient to cause the strip to fuse with the lid surface portion and frame.

A padded toilet seat lid in accordance with the invention includes a lid having an upper surface portion of a thermoplastic material and a cushion having a peripheral margin secured to said lid surface portion by means of a frame of a thermoplastic material which extends around the margin of the cushion. The frame has inner and outer parts overlying respectively the peripheral margin of the cushion and a surrounding part of the lid surface portion. The outer part of the frame is fused to the lid surface portion and the inner frame part holds the cushion against the said lid surface portion. The fused areas of the lid surface portion and frame have magnetically excitable particles dispersed therein.

Preferably, the frame is continuous and completely surrounds the cushion and is fused to the lid surface portion around its entire extent. This ensures that the cushion has an aesthetically pleasing appearance and prevents the edges of the cushion from curling and also from trapping dirt or moisture. The lower surface of the cushion is preferably also adhesively secured to the lid so as to resist any tendency for the cushion to pull out from the frame when the lid is in use. The adhesive will also prevent the cushion from creeping or bunching up when user sit on it or slide over it, and helps prevent dirt and moisture from finding its way into the space between the cushion and the lid. Also, the adhesive holds the cushion in place while the weld is formed between the frame and lid.

The lid is preferably a one-piece plastic moulding including the said upper surface portion. For example, the lid may be moulded in polypropylene. The same thermoplastic material is preferably used for making the frame and sealing strip.

BRIEF DESCRIPTION OF DRAWINGS

In order that the invention may be more clearly understood, reference will now be made to the accompanying drawings which illustrate a particular preferred embodiment of the invention only, and in which.

DESCRIPTION OF PREFERRED EMBODIMENT

Figure 1:
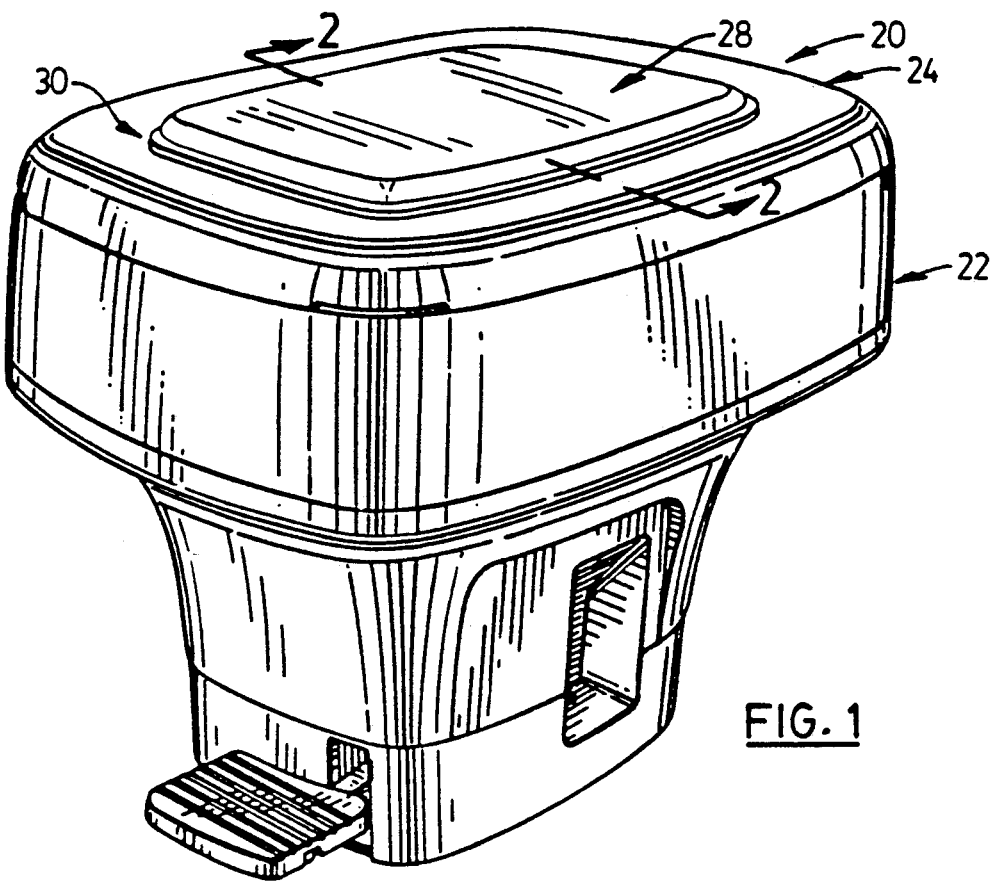
FIG. 1 is a perspective view from above of a toilet having a padded seat lid of the form provided by the invention.

Referring first to FIG. 1, a toilet is generally indicated by reference numeral 20 and includes a bowl part 22 which incorporates the toilet bowl (not shown) and a lid 24 which is hinged to part 22 so that the lid can be raised and lowered in conventional fashion. The lid encloses a toilet seat (not shown) and covers the bowl.

Apart from the lid, the remainder of the toilet is not illustrated in detail since it is irrelevant to the present invention. The lid may be used on many different designs of toilet including both permanently installed toilets and portable toilets.

Figure 2:
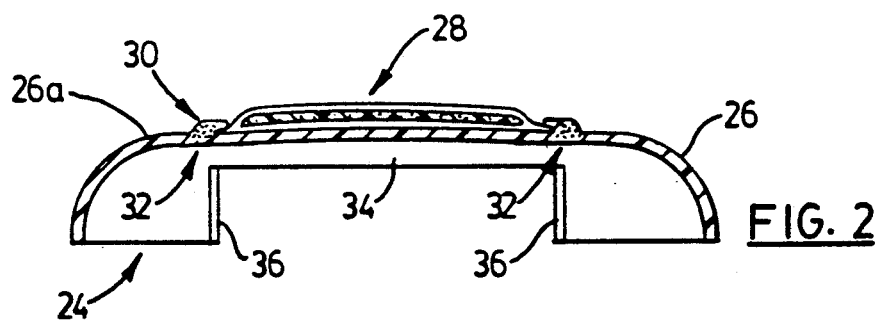
FIG. 2 is a vertical sectional view through the lid of the toilet of FIG. 1 and is taken on line 2—2 of FIG. 1.
Figure 3:
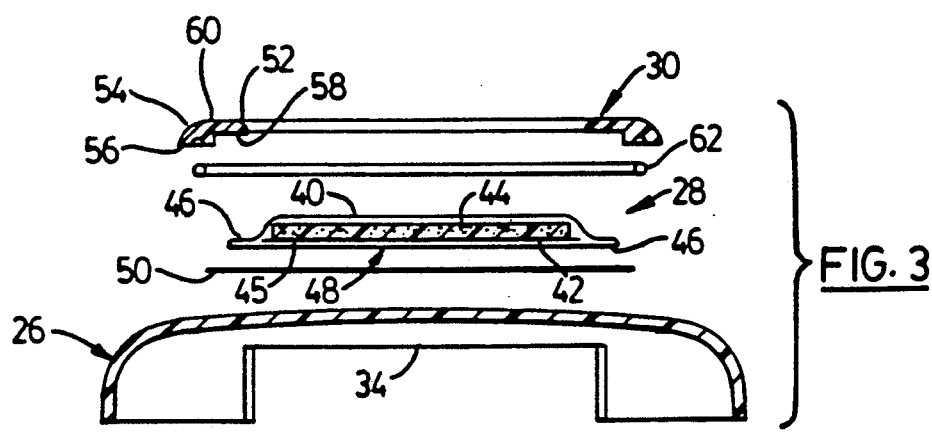
FIG. 3 is a view similar to FIG. 2 but showing the components of the padded lid in exploded positions; and, FIG. 4 is a schematic vertical sectional view through a welding fixture used in performing the method of the invention.

Referring particularly to FIGS. 2 and 3, the principal components of the padded lid are a base shell 26 forming the lid itself, a padded cushion 28, and a frame 30 which is fused to the lid 26 in the area that is generally indicated by reference numeral 32. FIG. 3 shows the components prior to the frame being fused to the lid and illustrates a sealing strip which is used to effect fusion, as will be described.

Lid 26 is essentially a conventional toilet seat lid and in fact may be used as a lid in itself without cushion 28 if desired. The lid is a plastic injection moulding, in this case in polypropylene. FIGS. 2 and 3 illustrate the fact that the lid has a conventional, generally concave shape as seen from below for enclosing the seat of the toilet. These views also show a recess 34 in the rear wall of the lid for accommodating hinge components (not shown) on the bowl part 22 of the toilet. Respective flanges 36 are provided at opposite sides of recess 34 and have openings for receiving hinge pins used to couple the lid to the lower part of the toilet.

Lid 26 has an upper surface portion 26a to which cushion 28 is secured. Surface portion 26a is shown as generally flat although in practice it may have a slightly convex shape.

As can be seen from FIG. 1, cushion 28 has an overall shape that generally follows the overall shape of the lid 26 as seen in plan. In this embodiment, the cushion is made up of upper and lower sheets of vinyl plastic material, denoted 40 and 42 respectively (see FIG. 3), an intervening foam layer 44 and a chipboard panel 45 between the lower vinyl sheet and the foam layer. The foam layer essentially defines the shape of the cushion and the two vinyl sheets are heat-sealed together around the perimeter of the foam layer to form a thinner peripheral margin 46. It is this margin that is secured to the lid 26 by frame 30.

In this embodiment, the cushion is also secured to lid 26 over the whole of the cushion's bottom surface. This is achieved by coating the bottom surface of vinyl sheet 42 with a suitable pressure-sensitive adhesive, which is generally indicated by reference numeral 48. This adhesive is protected by a release sheet 50 until the cushion is ready to be adhered to the lid as will be described later.

Frame 30 is shaped to follow the shape of the margin 46 of cushion 28 so that the frame essentially encircles the raised part of the cushion that is provided by the foam layer 44 in the assembled padded lid. As best seen in FIG. 3, the frame has co-extensive inner and outer parts 52 and 54 respectively. The inner part 52 is designed to overlie the cushion margin 46 while the outer frame part 54 overlies the top surface of the lid around margin 46 (in the assembled padded lid). Outer part 54 has a lower surface 56 that actually makes face-to-face contact with the top surface of the lid. The corresponding surface of the inner frame part 52 is denoted 58 and is stepped upwardly with respect to surface 56 in order to accommodate cushion margin 46. In the drawings, the extent of this step has been exaggerated somewhat for illustration purposes; the step will be quite small in practice to ensure that the inner frame part 52 firmly clamps the cushion margin 46 to the lid 26. Surface 58 may be provided with projections or other formations to assist in gripping the cushion margin if necessary.

A continuous groove or channel 60 is provided in the lower surface 56 of outer frame part 54 for receiving a sealing strip 62. The sealing strip is a circular section strand or filament of polypropylene with iron particles dispersed therein. Strip 62 and groove 60 are dimensioned with respect to one another so that, when the strip and groove are assembled together, the strip substantially fills the groove and protrudes only slightly from surface 56. Strip 62 is made in continuous lengths and is cut to occupy substantially the entire extent of groove 60 with opposite cut ends of strip 62 arranged in abutting relationship. As will be described in more detail in connection with FIG. 4, the components of the padded lid are in fact assembled upside down as compared with the orientation shown in FIGS. 2 and 3, with strip 62 being laid into groove 60 from above. This avoids any need to temporarily retain the sealing strip within the groove while assembly takes place and is therefore believed to be a preferred assembly technique (although not essential within the broad scope of the invention).

Figure 4:
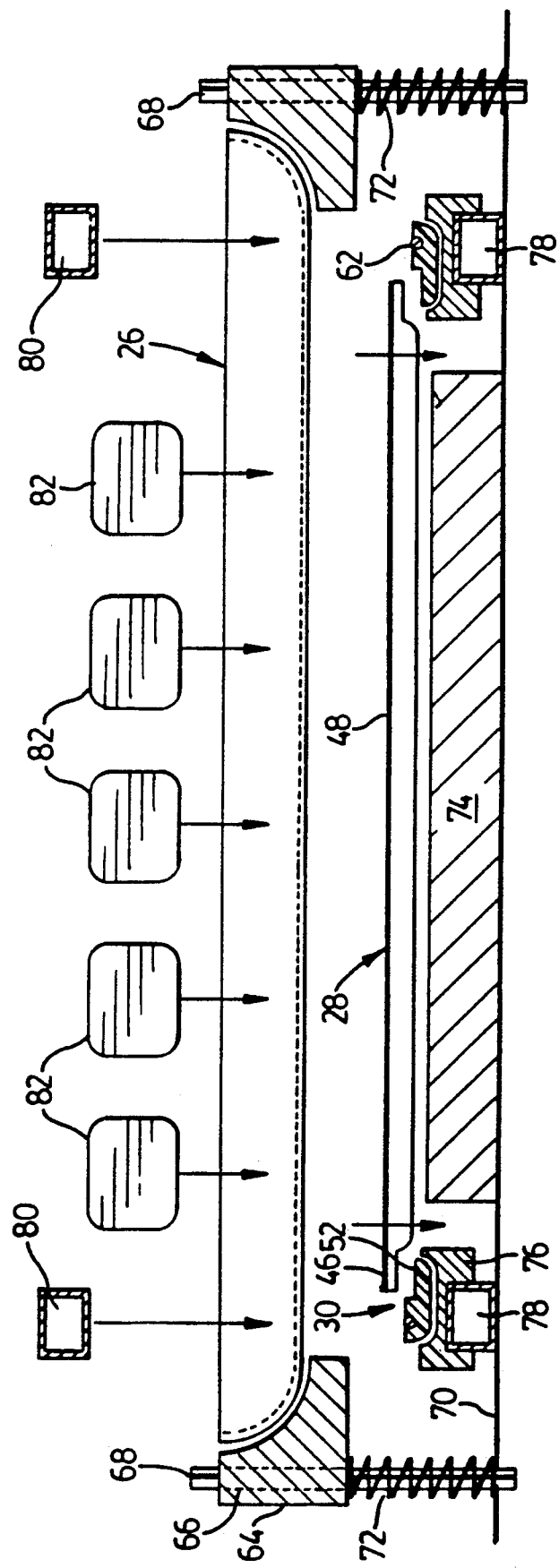

Turning now to FIG. 4, a welding fixture for use in assembling the padded toilet seat lid is shown in schematic form. FIG. 4 may be taken as a sectional view through the fixture and lid components along generally the same section line as that of FIGS. 2 and 3.

In FIG. 4, lid 26 is shown supported in an inverted position in a frame 64 which is carried by way of linear bearings 66 on a series of vertical guide rods 68 that extend upwardly from a fixed bed 70. Frame 64 is spring-biased into the upper position in which it is shown in FIG. 4 by compression springs 72 on the respective guide rods 68.

The lid cushion 28 is supported (also in an inverted position) directly below its intended position on lid 26, on a cushion support block 74 that is also disposed on fixture bed 70 but inwardly of the guide rods 68. As shown in FIG. 4, the release paper 50 (FIG. 3) has been removed from the bottom surface of cushion 28 so that the pressure-sensitive adhesive 48 is exposed for presentation to lid 26.

The cushion securing frame 30 is supported in its intended position with respect to the cushion 28 and lid 26 in a locator frame 76 that extends around the cushion support 74. In FIG. 4, the cushion 28 is in fact shown elevated above support block 74 for illustration purposes. However, in practice, the cushion will lie directly on support block 74 with its margin 46 in contact with the inner portion 52 of frame 30. The sealing strip 62 is placed in groove 60 of frame 30 and remains in place under the influence of gravity.

Excitation of the metallic particles within strip 62 is accomplished by exposing the strip to the effect of a high frequency magnetic field which is generated in induction coils placed close to the sealing strip. In the fixture shown in FIG. 4, one fixed coil and one movable coil is used. The fixed coil is indicated by reference numeral 78 and is supported on bed 70 below the locator 76 for frame 30. The coil is of rectangular shape in cross-section but in plan is shaped to follow the shape of frame 30, and hence the configuration of the sealing strip 62. The other coil is denoted by reference numeral 80 and is of essentially the same shape as coil 78. In FIG. 4, coil 80 is shown in an elevated position above lid 26. In fact, the coil is supported by the fixture so that it can be moved between this elevated position, in which the coil is inoperative, and an operating position in which the coil is positioned close to sealing strip 62 so that a magnetic field can be induced between the two coils. The two coils are electrically connected to a radio frequency generator of the type conventionally used for induction welding. Suitable equipment, including the sealing strip 62 is available from Emabond Inc. of Norwood, N.J., U.S.A.

In addition to the components shown in FIG. 4, the welding fixture includes suitable support structure for the upper coil 80 and for a series of soft rubber blocks 82 that move down with the coil and apply pressure during the weld cycle. For convenience of illustration, this structure has not be shown in FIG. 4. Basically, the structure comprises a movable press head that allows the coil 80 and blocks 82 to be moved to elevated positions for allowing access to the fixture for insertion of the components of the padded lid at the weld cycle, or moved downwardly into operative position for welding.

In practice, the first step in the sequence of operation of the welding process using the fixture shown in FIG. 4 involve placing the sealing strip 62 in the groove in frame 30 (with the frame inverted). The frame is then placed into locator 76. Next, the release paper 50 is removed from the bottom surface of the padded cushion and the cushion is loaded into the fixture on support 74. The lid is then placed in frame 64. Next, the fixture is actuated to cause the rubber blocks 82 to press downwardly on the lid and move it into contact with cushion 28 and frame 30. Coil 80 moves downwardly at the same time into the welding position. A magnetic field is then generated between the two welding coils 78 and 80, exciting the particles within the strip 62 and causing the strip to melt. The resulting heat causes localized melting of adjacent portions of frame 30 and lid 26 so that the frame is fused to the lid. The intensity of the magnetic field and the duration for which it is applied to the sealing strip must of course be carefully controlled so that a satisfactory weld is achieved without causing external thermal damage to the components. The components are held in their assembled positions in the fixture for a time sufficient to allow the weld to "freeze" and cooling water is circulated through the coils. The fixture is then open and the finished products removed.

It will of course be appreciated that the preceding description relates to a particular preferred embodiment of the invention and that modifications are possible within the broad scope of the invention. Some of those modifications have been indicated previously and others will be apparent to a person skilled in the art.

I claim:

1. A padded toilet seat lid comprising:
   a lid having an upper surface portion made of a thermoplastic material;
   a cushion having a peripheral margin; and,
   a frame having inner and outer parts overlying respectively said peripheral margin of the cushion and a surrounding part of said lid surface portion, said outer part of the frame being fused to said lid surface portion in a fused area having magnetically excitable particles dispersed therein.

2. A padded toilet seat lid as claimed in claim 1, wherein said cushion is additionally secured to said lid upper surface portion by an adhesive in the area inwardly of said peripheral margin.

3. A padded toilet seat lid as claimed in claim 1, wherein said lid is a one-piece thermoplastic moulding including said upper surface portion.

4. A padded toilet seat lid as claimed in claim 3, wherein said lid and frame are made of polypropylene and are fused together by a polypropylene sealing strip having said magnetically excitable particles dispersed therein.

5. A padded toilet seat lid as claimed in claim 1, wherein said cushion comprises upper and lower vinyl sheets heat sealed together around peripheral margins thereof to form said peripheral margin of the cushion, and a foam layer between said vinyl sheets and surrounded by said peripheral margin.

6. A padded toilet seat lid as claimed in claim 5, wherein said frame completely encircles the portion of said cushion which includes said foam layer and is fused to the lid over its entire extent.

7. A toilet having a padded lid as claimed in claim 1.

* * * * *